UNITED STATES PATENT OFFICE.

ACHILLE CHAUMAT, OF FRESNOY-LE-GRAND, FRANCE, ASSIGNOR TO COMPAGNIE FRANCAISE DES APPLICATIONS DE LA CELLULOSE, OF PARIS, FRANCE, A CORPORATION OF FRANCE.

PROCESS FOR THE PREPARATION OF CONCENTRATED SOLUTIONS OF CELLULOSE.

1,062,222.     Specification of Letters Patent.     Patented May 20, 1913.

No Drawing.     Application filed June 26, 1911. Serial No. 635,333.

*To all whom it may concern:*

Be it known that I, ACHILLE CHAUMAT, citizen of the French Republic, residing at Fresnoy-le-Grand, Department of the Aisne, France, have invented certain new and useful Improvements in Processes for the Preparation of Concentrated Solutions of Cellulose; and I do hereby declare the following to be a full, clear, and exact description of the invention, such as will enable others skilled in the art to which it appertains to make and use the same.

This invention relates to the manufacture of concentrated solutions of cellulose by means of copper hydroxid and ammonia in which the proportion of cellulose may amount to 15% and more. It has been suggested to obtain solutions of the above degree of concentration by first preparing a copper oxid ammoniacal solution during the preparation of which a certain quantity of carbonic acid is added, the cellulose itself being added subsequent to the precipitation of the copper hydrate.

In accordance with the present invention I dissolve cupro-cellulose in ammonia the cupro-cellulose being obtained by causing cellulose divided and moderately bleached to absorb separately prepared copper hydroxid as hereinafter described.

It should be noted that the result obtained is not at all the same if the copper hydroxid be precipitated upon the cellulose itself, that is to say, if for example, a salt of copper is mixed with the cellulose and the soda be added to the mixture or if the cellulose and the soda be mixed and a copper salt added. In order that the cupro-cellulose may be in an appropriate condition for the subsequent solution it is necessary that the combination of the copper hydroxid should take place with the cellulose diluted in a sufficient quantity of water. Otherwise there would be a risk of obtaining a cupro-cellulose wanting in homogeneity, that is to say, containing free cellulose at certain places and an excess of copper hydroxid in other places.

The cupro-cellulose prepared under bad conditions does not dissolve well in ammonia but furnishes gelatinous lumps which are impossible to reduce and which lowers the proportion of cellulose in that part of the solution which can be utilized. The quantities of reagents which are best suited for obtaining this cupro-cellulose are those most closely approaching the following quantities; for 1 part of cellulose a quantity of a copper salt soluble in water is taken such that the ratio of the cellulose to the copper which will be precipitated in the form of a hydroxid will be equal to 2. If crystallized copper sulfate containing about 25% of metallic copper be utilized 2 parts of crystallized copper sulfate are used for 1 part of cellulose. The proportion of soda to be employed for the formation of the copper hydroxid is the theoretical quantity. The proportion of aqua ammonia necessary for the solution of the cellulose of copper approaches that which gives the following ratio:

$$\frac{\text{Cellulose}}{\text{Dry NH}_3} = 1.$$

These quantities of reagents are cited as giving the best results, they are not however essential.

(1). Example: 30 kilos of cotton waste scalded and slightly bleached are pulped in a rag engine until a portion of the paste crushed between the fingers no longer forms solid lumps; the cotton paste obtained is then diluted in cold water in such a manner that the mixture occupies a volume of about 3000 liters. 60 kilos of crystallized $CuSO_4$ is also dissolved in 300 to 400 liters of water in a reservoir of copper, wood or enameled iron. This solution of $CuSO_4$ at the ordinary temperature is poured gradually into 40 liters of caustic soda lye of a strength equal to 38° Baumé diluted in 3 to 4 times its volume of water, while constantly stirring. If the operation be carried out carefully the temperature of the copper hydroxid paste is not higher than the solution temperature of the $CuSO_4$ and it is not necessary to cool. A small quantity of a body which prevents the dehydration of the copper hydroxid such as sugar for example can be added to the caustic lye. The copper hydroxid paste obtained is mixed with the pulped cellulose in any suitable apparatus for example in the rag engine itself or in a tank with a mechanical agitator or by means of compressed air. The absorption of the copper hydroxid by the cellulose is instantaneous and the cellulose of copper obtained is separated from the water in a filter-press or merely by draining and is then treated in a turbine or pressed to bring it to the desired weight which can readily be effected because, contrary to what is the case with $Cu(OH)_2$, the cellulose of copper can readily be separated from its water. Prepared in these conditions it presents a beautiful blue color and keeps without alteration so that considerable quantities of it can be stored if desired. The process of preparing the cupro-cellulose thus described therefore necessitates only a single drying or pressing of the final cupro-cellulose. The product thus pressed or treated in a turbine is then crushed either in the agitator which serves for dissolving it or in any other appropriate apparatus until the cupro-cellulose is reduced uniformly into small grains of approximately the size of a grain of wheat; it is then moistened with the quantity of ammonia necessary for dissolving it, say 100 liters of ammonia of a strength equal to 28° Baumé. The mixture is rendered intimate by agitating or kneading for 15 to 20 minutes and is then allowed to rest until perfect dissolution takes place which occupies about 24 hours. The agitator is restarted and continues in motion for some time and then a small quantity of caustic soda lye at 38° Baumé diluted in an equal volume of water is added, about 0.600 of a liter of NaOH at 38° Baumé per kg. of the cotton dissolved. This addition of caustic soda lye serves for liquefying the solution and facilitating its subsequent filtration. In this manner highly concentrated solutions of cellulose are obtained (up to 15%) and they are perfectly homogeneous and free from lumps.

The advantages of this process are as follows: It necessitates only a single filtration and pressing of the cupro-cellulose, thereby economizing time and material. It utilizes only bodies that can be readily manipulated and it does not necessitate the employment of a low temperature. It enables highly concentrated solutions of cellulose to be obtained which are specially suited for producing artificial tissues.

I claim:

A process for the manufacture of concentrated solutions of cellulose in which separately prepared copper hydroxid is mixed with cellulose in the form of a paste after which the cupro-cellulose obtained is pressed and reduced to the size of wheat grains the product being then moistened with sufficient ammonia to dissolve it subjected to further treatment in a kneading or agitating apparatus a small quantity of caustic soda lye being subsequently added thereto.

In testimony whereof I affix my signature, in presence of two witnesses.

ACHILLE CHAUMAT.

Witnesses:
 H. C. COXE,
 EMILE KLOTZ.